United States Patent [19]

Seeley

[11] Patent Number: 4,551,681

[45] Date of Patent: Nov. 5, 1985

[54] MAGNETIC SUSCEPTIBILITY WELL-LOGGING UNIT WITH SINGLE POWER SUPPLY THERMOREGULATION SYSTEM

[75] Inventor: Robert L. Seeley, Denver, Colo.

[73] Assignee: The United States of America as represented by the Secretary of the Interior, Washington, D.C.

[21] Appl. No.: 490,276

[22] Filed: May 2, 1983

[51] Int. Cl.⁴ .................. G01V 3/26; E21B 47/06; H01F 27/08
[52] U.S. Cl. .................... 324/333; 324/224; 324/323; 324/346; 336/55
[58] Field of Search ............... 324/323, 333, 339, 340, 324/346, 201, 224, 225; 336/55, 62

[56] References Cited

U.S. PATENT DOCUMENTS

| | | | |
|---|---|---|---|
| 2,625,583 | 1/1953 | Broding | 324/333 |
| 2,640,869 | 6/1953 | Zimmerman | 324/333 |
| 2,974,303 | 3/1961 | Dixon | 324/323 X |
| 3,152,303 | 10/1964 | Lary et al. | 324/224 |
| 3,818,323 | 6/1974 | Dowling et al. | 324/339 |
| 3,831,082 | 8/1974 | Mazzagatti | 324/346 X |
| 4,015,194 | 3/1977 | Epling | 324/323 X |
| 4,427,941 | 1/1984 | Riedesel et al. | 324/323 |

FOREIGN PATENT DOCUMENTS 0021363  2/1979  Japan .................. 324/224

Primary Examiner—Gerard R. Strecker
Attorney, Agent, or Firm—Thomas Zack

[57] ABSTRACT

The magnetic susceptibility well-logging unit with single power supply thermoregulation system provides power from a single surface power supply over a well-logging cable to an integrated circuit voltage regulator system downhole. This voltage regulator system supplies regulated voltages to a temperature control system and also to a Maxwell bridge sensing unit which includes the solenoid of a magnetic susceptibility probe. The temperature control system is provided with power from the voltage regulator system and operates to permit one of several predetermined temperatures to be chosen, and then operates to maintain the solenoid of a magnetic susceptibility probe at this chosen temperature. The temperature control system responds to a temperature sensor mounted upon the probe solenoid to cause resistance heaters concentrically spaced from the probe solenoid to maintain the chosen temperature. A second temperature sensor on the probe solenoid provides a temperature signal to a temperature transmitting unit, which initially converts the sensed temperature to a representative voltage. This voltage is then converted to a representative current signal which is transmitted by current telemetry over the well logging cable to a surface electronic unit which then reconverts the current signal to a voltage signal.

17 Claims, 5 Drawing Figures

4,551,681

MAGNETIC SUSCEPTIBILITY WELL-LOGGING UNIT WITH SINGLE POWER SUPPLY THERMOREGULATION SYSTEM

TECHNICAL FIELD

This invention relates to magnetic well-logging systems generally, and particularly to improvements in the thermoregulation of magnetic susceptibility well-logging systems to permit more accurate measurement of low concentrations of ferromagnetic minerals in wells while minimizing noise and drift problems.

BACKGROUND ART

The relationship between magnetic susceptibility and the ferromagnetic mineral content of rock varies with mineral assemblage, rock type, and with grain size, shape and orientation, but in all cases there has been found to be a strong, sometimes nearly linear correlation between the two. The magnetic susceptibility of magnetic rocks that contain ore-grade concentrations of iron minerals is high, making it possible to obtain borehole measurements of good quality with relatively simple, low-sensitivity logging probes. Measurements become increasingly difficult as the ferromagnetic mineral content decreases to the low levels generally associated with sedimentary rocks ($<0.1$ percent magnetite). In order to measure the magnetic susceptibility of these rocks, the sensitivity of the well-logging system must be increased several orders of magnitude, and consequently noise and drift due to temperature variation and mechanical stress of components in the measurement system became significant. Nevertheless, making borehole measurements of the magnetic susceptibility of rocks that have low concentrations of ferromagnetic minerals is desirable because these measurements may reveal alteration zones associated with the emplacement of valuable non-ferrous minerals, particularly uranium in roll-type deposits.

To provide borehole measurement of the magnetic susceptibility of rock, well-logging probes have been developed which include sensing elements consisting of a solenoid wound on a cylindrical core made of a high-permeability ferromagnetic material. The coil is connected in the inductance arm of a Maxwell bridge, and variations in the off-balance output signal of the bridge are used to detect variations in the magnetic susceptibility of rock surrounding the probe in a borehole.

Changes in the magnetic susceptibility of rock are accompanied by nearly proportional changes in the amplitude of the quadrature phase of the bridge output signal of the probe. It was found, however, to be extremely difficult to stabilize the drift and reduce the noise so that meaningful borehole-logging measurements could be made at high sensitivities with uncompensated probes.

In order to stabilize drift caused by temperature variations, probes are designed with a temperature regulated electric heater which surrounds the sensing coil or some other portion of the probe. Prior art temperature stabilized probes are shown in U.S. Pat. Nos. 2,640,869 to C. W. Zimmerman and 3,818,323 to D.J. Dowling et al. These designs represent a significant contribution over previous unstabilized probe constructions, but some significant factors still exist which adversely affect the accuracy of measurements accomplished with the prior art probes. For example, electrical power sent down a well-logging cable is dependent upon cable temperature, resistance, and probe operating conditions. Even a well regulated voltage applied to the cable at the surface will arrive at the downhole electronics diminished by "IR" voltage drops caused by the current (I) being demanded downhole passing through cable wires which have resistance (R). As less current is needed downhole, more voltage will arrive downhole because the IR voltage drop will be lower. Therefore, voltage delivered downhole must be considered as unregulated and, depending on cable resistance (usually larger for long cables or cables having more, smaller wires), can vary over a wide range. For example, a current of 250 milliaps that might be required by a probe heater would cause a voltage drop of 100 volts over a cable having 200 ohms each in the power supply ad return wires needed for borehole work down to 8000 feet. A variation of $\pm 50$ milliamps about this current would cause the IR voltage drop to vary by $\pm 10$ volts.

In an attempt to compensate for the significant voltage variations caused by cable temperature, cable resistance and varying probe operating conditions, probe systems have been designed with two separate power supplies; a positive and a negative supply. Such probe systems, maufactured by Simplec Manufacturing Company of Dallas, Texas, are much improved over previous systems, but sill experience drift and noise which make accurate and reliable measurements of magnetic susceptibility in rocks with low concentrations of magnetic materials difficult to obtain.

DISCLOSURE OF THE INVENTION

A primary object of the present invention is to provide a novel and improved magnetic susceptibility well-logging system designed to minimize drift and noise in the system electronics to permit accurate measurements to be made where the magnetic susceptibility of rock is low. Drift is stabilized by the use of a temperature regulated heater system which is incorporated within an improved probe unit, while noise is reduced by employing noise rejection techniques in the system circuit design.

Another object of the present invention is to provide a novel and improved magnetic susceptibility well-logging system which includes a novel probe design to minimize system drift. The magnetic susceptibility sensing probe includes a centrally located solenoid unit which is heated by electrical resistance heaters spaced concentrically from the solenoid unit. The electric heaters are thermally coupled to the solenoid unit by a heat conducting medium which fills the intervening space therebetween.

A further object of the present invention is to provide a novel and improved magnetic susceptibility well-logging system which incorporates an improved temperature control circuit for maintaining the temperature of a magnetic susceptibility sensing probe at a preset temperature while providing probe temperature indications to a surface indicator. The temperature control circuit converts the sensed temperature to a voltage signal downhole and then converts this voltage signal to a current signal for transmission over a cable to uphole electronics where the current signal is again converted to a voltage signal.

Another object of the present invention is to provide a novel and improved magnetic susceptibility well-logging system which includes improved temperature sensing circuitry adopted to obtain probe temperature data and to transmit this data by current telemetry over a well-logging cable. A single surface power supply provides power over the well-logging cable to integrated circuit voltage regulators in a downhole circuit which then supply regulated voltages to a magnetic susceptibility sensing probe and to the temperature maintaining and sensing circuits for such probe. Data signals transmitted up the well-logging cable are transformer coupled to surface electronic systems.

A still further object of the present invention is to provide a novel and improved magnetic susceptibility well-logging system which includes a bridge susceptibility probe circuit supplied with a reference signal by a crystal stabilized oscillator. A second regulated reference signal is provided to the bridge which differs from system ground.

The aforesaid objects are attained by supplying voltage from a single surface voltage source over a well-logging cable to an integrated circuit voltage regulator system downhole. This voltage regulator system supplies regulated voltages to a temperature control system and also to a Maxwell bridge sensing unit which includes the solenoid of a magnetic susceptibility probe. The Maxwell bridge is provided with a reference signal by a crystal stabilized oscillator and a second reference signal which differs from ground by the voltage regulator system. A detector connected to the Maxwell bridge and the crystal oscillator provide signals over the well-logging cable to surface electronics.

The temperature control system permits one of several predetermined temperatures to be chosen, and then operates to maintain the solenoid of a magnetic susceptibility probe at this chosen temperature. The temperature control system operates in response to a temperature sensor mounted upon the probe solenoid to cause resistance heaters concentrically spaced from the probe solenoid to maintain the chosen temperature. The resistance heaters are thermally coupled to the solenoid by a heat conducting medium in the space between the solenoid and the heaters.

The temperature control system also includes a temperature sensing unit which senses the temperature of the probe solenoid and initially converts the sensed temperature to a representative voltage. This voltage is then converted to a representative current signal which is transmitted by current telemetry over the well-logging cable to a surface electronic unit which then reconverts the current signal to a voltage signal. Signals over the well-logging cable from the downhole electronic system are transformer coupled to the surface electronic unit.

BEST MODE FOR CARRYING OUT THE INVENTION

Figure 1:
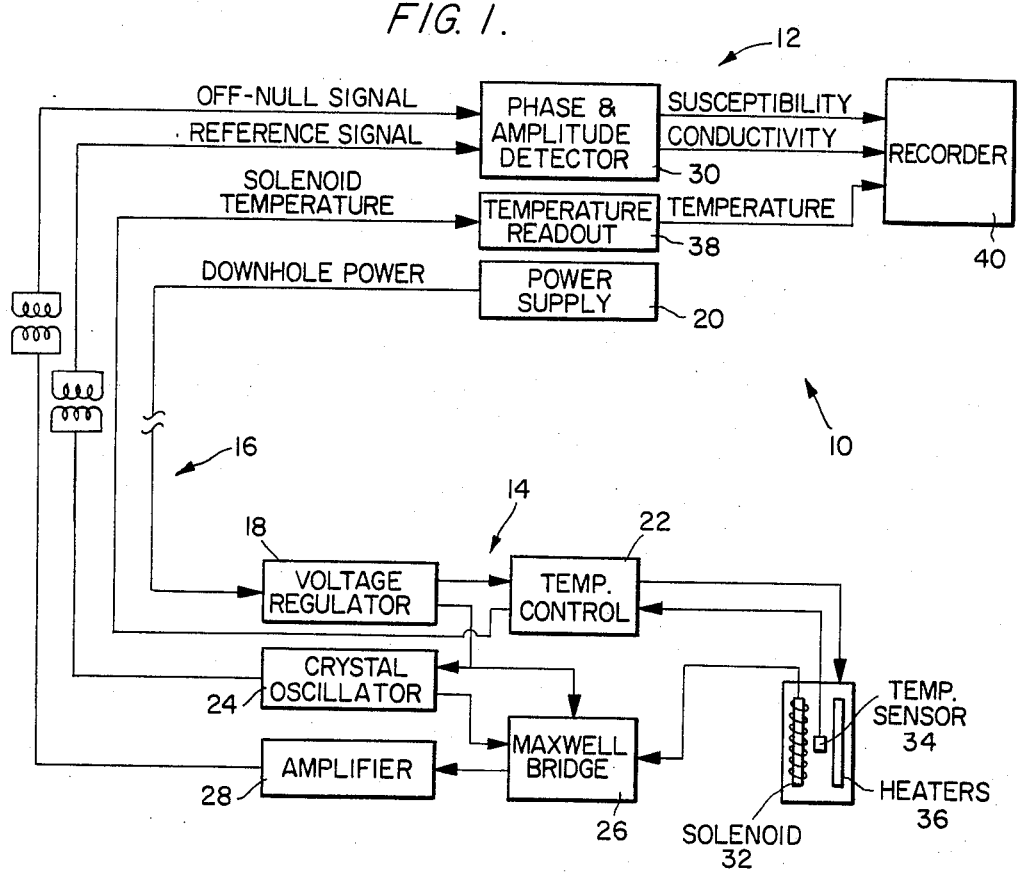
FIG. 1 is a block diagram of the magnetic susceptibility well-logging unit with single power supply thermoregulation system of the present invention.

Referring now to FIG. 1, a magnetic susceptibility well-logging system incorporating the features of the present invention is indicated generally at 10. The system 10 includes a surface electronic section 12 which is connected to a borehole probe electronic system 14 by means of lines for a well-logging cable 16. Electrical power sent down a well-logging cable is dependent upon cable temperature, resistance, and probe operating conditions, and even a well regulated voltage applied to the cable at the surface will arrive at the borehole probe electronic system diminished by voltage drops caused by the current being demanded downhole passing through the resistance of the cable wires. To compensate for such voltage variations, the borehole probe electronic system 14 includes a voltage regulator section 18 which is used to regulate downhole voltages that would otherwise vary due to changing voltage drops in the cable 16 as downhole current requirements vary. This voltage regulator section includes integrated circuit voltage regulators wich receive voltage over the cable from a single surface power supply 20. Regulated voltage outputs from the voltage regulator section 18 are provided to a temperature control section 22 and to power a crystal oscillator 24 which provides a reference signal to a Maxwell bridge 26. Also, a regulated voltage from the voltage regulator 18 having a value which is different from power supply ground, is provided as a reference voltage for one side of the Maxwell bridge detector output. The other side of the bridge detector output is connected to an amplifier 28 which provides an off-null signal to a phase and amplitude detector 30 in the surface electronic section 12.

As is known in the art, the magnetic susceptibility and the conductivity of a medium can be measured by detecting the change from null (established in air) of a Maxwell bridge caused by a change in the inductance and effective resistance of a solenoid 32 which is placed near the medium and which is included in one arm of the bridge. Magnetically susceptible materials change the inductance, whereas conductive materials change the effective resistance of the solenoid. These changes can be converted into voltages representative of the magnetic susceptibility and conductivity of the surrounding medium by appropriate phase shifting and comparison with a reference signal in the phase and amplitude detector 30. Basically, the phase and amplitude detector may include a differential input amplifier that amplifies the difference between the off-null signal from the amplifier 28 and a reference signal provided by the crystal oscillator 24.

The temperature control section 22 provides a dual function with respect to solenoid 32. First, the temperature control section operates in response to a signal provided by a temperature sensing assembly 34 to control the activation or deactivation of electric heaters 36. Secondly, the temperature control section operates to receive a temperature signal from the temperature sensing assembly 34 and to provide this temperature signal to a temperature readout section 38 in the surface electronic section 12. It should be noted that signals transmitted to the surface from the crystal oscillator 24 and the amplifier 28 are transformer coupled and isolated from power ground in order to prevent ground loops from disturbing the transmission. The outputs from the phase and amplitude detector 30 and temperature readout section 38 may be recorded in recorder 40 or may be otherwise indicated.

Figure 2:
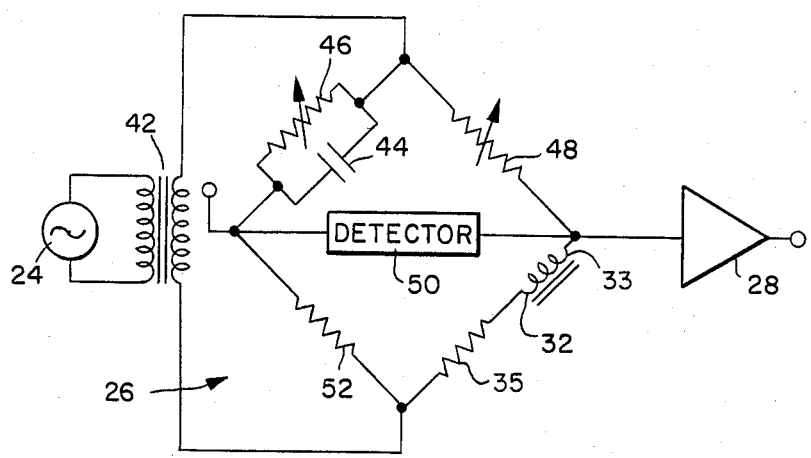
FIG. 2 is a circuit diagram of the Maxwell bridge circuit used in the system of FIG. 1.

Turning now in detail to the crystal oscillator 24, the Maxwell bridge 26 and the solenoid 32, it will be noted from FIG. 2 that the crystal oscillator is transformer coupled by means of a transformer 42 to the Maxwell bridge 26. This, combined with the use of a crystal stabilized oscillator, provides a significant reduction in the electronic noise of the system. Conventional phase-shift oscillators change frequency with temperature due to capacitor and semiconductor characteristic temperature changes. Although ovens have been used to stabilize oscillator drift by heating components to a stabilized temperature greater than the expected ambient temperature, the use of the crystal stabilized oscillator 24 is a much better solution.

One arm of the Maxwell bridge 26 includes the solenoid 32 with the solenoid inductance 33 and effective resistance 35. The opposed upper arm of the bridge contains a capacitor 44 which balances the reactance of the solenoid 32. The capacitor is connected in parallel with a variable resistor 46 which operates in conjunction with a second variable resistance 48 to null the bridge in air so that a signal measured by a detector 50 is zero. Another bridge resistor 52 is fixed at a resistance value equivalent to the reactance of the solenoid 32. The Maxwell bridge 26 is thermally stabilized by employing resistors and capacitors with low temperature coefficients.

Turning now to the solenoid 32, a constant temperature environment for the solenoid is maintained by placing series-connected heater resistors indicated generally at 36 around the solenoid. It has been found, however, that the manner of attaching these heater resistors can be extremely important, for otherwise significant changes in the solenoid inductance may occur. For example, the inductance of the solenoid may vary with temperature, and also may vary electromagnetically in response to the amount of current flowing through the heater resistors. It has been determined that significant inductance changes occur when the heater resistors are attached directly to the exterior of the solenoid with epoxy. Epoxies which are chosen for high thermal conductivity and low thermal expansion still have a thermal expansion coefficient which differs from that of copper, and consequently an inductance shift due to mechanical stress and strain occurs in the solenoid.

Figure 3:
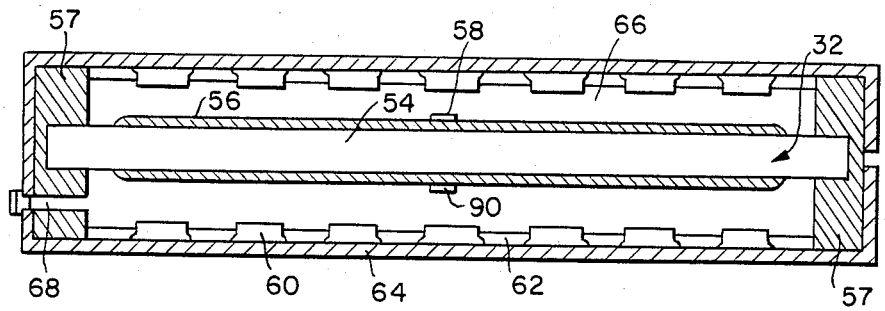
FIG. 3 is a sectional view of a magnetic susceptibility sensing probe used with the system of FIG. 1.

With reference to FIG. 3, a solenoid heater assembly is illustrated wherein resistance heaters are suspended around the solenoid and are separated therefrom to greatly reduce the effect of the heaters on the solenoid inductance. With reference to FIG. 3, it will be noted that the solenoid 32 includes a core 54 of ferrite or other suitable material which supports a solenoid coil 56. Temperature sensors, indicated at 58 and 90, are mounted directly on the exterior of the coil 56, and the coil and core are supported by end core supports 57.

A plurality of electrical resistance heaters 60, which constitute the heater 36 of FIG. 1, are suspended around the solenoid 32 by a fiber tube heater support 62 which is mounted within the core supports 57 and spaced concentrically from the solenoid. A shell 64 is then formed about the fiber tube heater support and the core supports to provide both electrostatic shielding and thermal insulation. This shell may be formed of Bakelite or other similar material.

Spacing of the heaters 60 from the solenoid 32 minimizes the electromagnetic change in solenoid inductance caused by the heaters, since the solenoid is now removed from the weak magnetic field around the heater resistors. However, it is necessary to maintain good thermal exchange between the heater resistors and the solenoid, and this thermal exchange can be enhanced by filling the space 66 with a highly viscous, thermally stable silicone grease. This grease may be inserted into the space 66 through a filler passage 68 in one core support 57.

Figure 4:
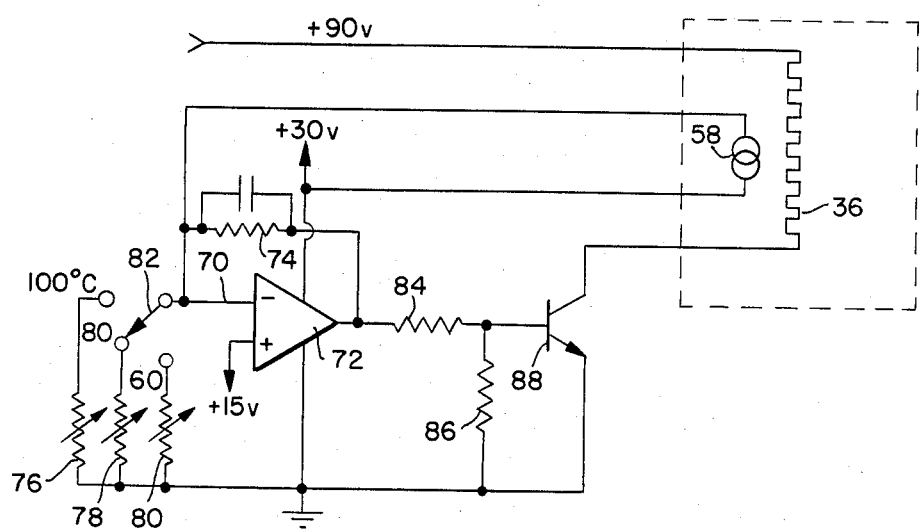
FIG. 4 is a circuit diagram of a temperature control circuit used with the system of FIG. 1.

FIG. 4 illustrates the portion of the temperature control system 22 which operates to maintain the temperature of the solenoid 32 at a selected constant temperature. This control system operates in response to the temperature sensor 58 which, with heaters 36, is included in the assembly of FIG. 3 with the solenoid. The temperature sensor 58 constitutes one of the sensors in the temperature sensing assembly 34, and all of these temperature sensors may be formed by two terminal integrated circuit temperature transducers that generate one microamp for each degree Kelvin present around the sensor. The output current from the temperature sensor 58 is applied to the inverting input 70 of an operational amplifier 72. This operational amplifier has a feedback current which is determined by the amplifier's output voltage, a feedback resistor 74 connected in a feedback circuit around the amplifier, and the voltage drop across one of a plurality of variable resistors 76, 78, and 80 which are used to select the control temperature for the heater 36. One of these variable resistors is selected by means of a switch 82 which is connected to the inverting input 70 of the operational amplifier 72.

The output voltage from the operational amplifier varies linearly and inversely proportional to the heater temperature for temperatures near the control temperature set by the switch 82. Because the output of an operational amplifier is restricted by its power supply voltage (+30 volts and ground in FIG. 4) the output voltage from the operational amplifier will vary linearly near the control temperature or for voltages between the power supply voltages. As a result, the feedback resistor 74 also selects the width of the control band of temperatures. For example, with power supply voltages of ground and +30 volts, a feedback resistor 74 of one megohm will determine an output voltage change of 1 volt for each 1 degree (centigrade) change in temperature over a 26 volt (or degrees centigrade) range. Using 10 megohms for the feedback resistor 74 will increase this sensitivity (10 volts output for each 1 degree centigrade change of temperature) and limit thermoregulation to a narrower band of temperatures (2.6 centigrade degrees).

The operational amplifier output voltage is attenuated by a voltage divider formed by resistors 84 and 86 in order to properly bias a power transistor 88 which constitutes a power control element for the heater 36.

The voltage regulator section 18 provides well regulated input voltages for the heater 36 and the operational amplifier 72. As previously indicated, the voltage regulators are preferably integrated circuit regulators which may contain constant regulated voltages substantially independent of temperature variations.

Figure 5:
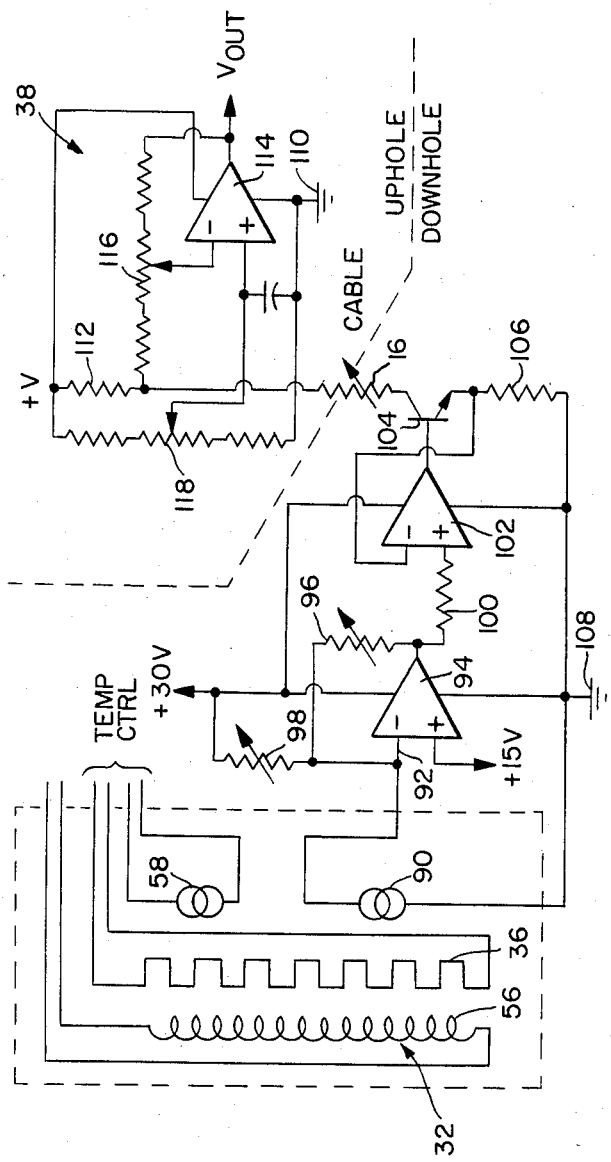
FIG. 5 is a circuit diagram of a temperature sensing and indicating circuit used with the system of FIG. 1.

The temperature control section 22 also includes a circuit for providing a solenoid temperature readout to the temperature readout unit 38. This circuit, illustrated in FIG. 5, includes a two terminal temperature sensor 90 of similar construction to the temperature sensor 58 which, with the temperature sensor 58, forms the temperature sensing assembly 34. The temperature sensor 90 is also mounted on the solenoid 32 and is connected to the inverting input 92 of an operational amplifier 94. The output voltage of this operational amplifier increases as the temperature sensed by the temperature transducer 90 increases, and this operational amplifier converts the sensed temperature to a 100 mv/°C. output for temperatures between 20° C. and 150° C. A variable resistor 96 in the feedback circuit for the operational amplifier 94 is used to set this signal gain, and a second variable resistor 98 connected to the inverting input of the amplifier 94 is used to adjust voltage offset. The output from the first operational amplifier 94 is coupled by means of a coupling resistor 100 to the non-inverting input of an operational amplifier 102. This second operational amplifier buffers the 100 mv/°C. signal through a transistor 104 and across a precision resistor 106. This converts the 100 mv/°C. to a 100 microamp/°C. current that flows from the surface power supply 20 down through a cable wire 16 and through the transistor 104 and resistor 106 to ground. The downhole ground 108 is not at the same potential as the surface ground 110. The transistor 104 is controlled by the operational amplifier 102 to accurately determine the amount of current flowing to ground through the resistor 106. On the surface, the current signal is converted back to voltage by another precision resistor 112 and is referenced to surface ground by an operational amplifier 114 having its gain adjusted to provide a 100 mv/°C. output. Two potentiometers 116 and 118 are used for mid-voltage offset and gain adjustment. The output from the operational amplifier 114 is then directed to the recorder 40.

Monitoring temperature accurately downhole is difficult because of cable noise, and interlead mutual inductance can mask small changes in voltage set up a cable. Even differential amplifiers with large common mode rejection ratios do not provide the desired resolution of 0.01° C. over a 10° C. range. Consequently, the conversion of voltage signals to current signals by the operational amplifier 102 and transistor 104 corrects this problem by eliminating the effects of variations and cable impedance and by reducing the noise pick-up because of the low impedance of the driver circuit relative to the power supply ground. This use of current telemetry, wherein the temperature signal is reduced to a current signal downhole and is then reconverted to a voltage signal in the operational amplifier 114 of the temperature readout section 38, has reduced the cable induced noise significantly.

INDUSTRIAL APPLICABILITY

The novel magnetic susceptibility well-logging system of the present invention may be effectively employed to make accurate borehole measurements of the magnetic susceptibility of rocks that have low concentrations of ferromagnetic minerals. This system operates effectively to obtain low noise, low drift measurements with sufficient sensitivity to detect low values of magnetic susceptibility.

I claim:

1. A magnetic susceptibility well-logging system comprising surface electronic circuit means including a power supply, a well-logging cable means connected to said surface electronic circuit means and operative to conduct power from said power supply, and a magnetic susceptibility measuring circuit means connected to said well-logging cable means in spaced relationship to said surface electronic circuit means and operating to send data signals by current telemetry over said well-logged cable means to said surface electronic circuit means, said magnetic susceptibility measuring circuit means including voltage regulator means connected to said well-logging cable means to receive power from said power supply and operating to provide one or more regulated output voltages at a regulator output means, stabilized oscillator means connected to said regulator output means and operative to provide a reference signal, sensing bridge means connected to said regulator output means to receive said reference signal from said stabilized oscillator means, said sensing bridge means including a measuring probe means for sensing magnetic susceptibility which is connected to receive a regulated output voltage from said regulator output means, and detector means connected to said sensing bridge means and to receive said reference signal from said stabilized oscillator means.

2. The magnetic susceptibility well-logging system of claim 1 wherein said magnetic susceptibility measuring means includes heater means connected to receive a regulated output voltage from said regulator output means, temperature transducer means connected to receive a regulated output voltage from said regulator output means and operative to sense the temperature of sad measuring probe means and provide an output signal which is a function of the magnitude of said sensed temperature, control means connected to receive a regulated output voltage from said regulator output means and the output signal from said temperature transducer means, said control means operating to provide a control signal which varies linearly and is inversely proportional to said temperature transducer output signal, and power control means connected to receive said control signal and operative in response thereto to control the magnitude of the regulated voltage to said heater means.

3. The magnetic susceptibility well-logging system of claim 2 wherein said measuring probe means includes a second temperature transducer means mounted thereon and connected to receive a regulated output voltage from said regulator output means, said second temperature transducer means operating to sense the temperature of said measuring probe means and provide an output signal which is a function of said sensed temperature.

4. The magnetic well-logging system of claim 1 wherein said probe means includes a solenoid sensing means, heater means spaced from said solenoid sensing means, and a heat conducting medium filling the space between said heater means and said solenoid sensing means to thermally couple said solenoid sensing means to said heater means.

5. The magnetic susceptibility well-logging system of claim 4 wherein said solenoid sensing means includes an elongated core, a solenoid coil wrapped on said elongated core, and tubular mounting means to mount said heater means in concentric spaced relationship to said solenoid sensing means.

6. The magnetic susceptibility well-logging system of claim 5 wherein said measuring probe means includes a casing enclosing said solenoid sensing mseans and said heater means, said casing being filled with a highly viscous, thermally stable silicon grease to thermally couple said heater means to said solenoid sensing means.

7. The magnetic susceptibility well-logging system of claim 6 wherein said measuring probe means includes temperature sensing transducer means mounted upon said solenoid sensing means.

8. A magnetic susceptibility well-logging system comprising surface electronic circuit means including a power supply, a well-logging cable means connected to said surface electronic circuit means and operative to conduct power from said power supply, and a magnetic susceptibility measuring circuit means connected to said well-logging cable means in spaced relationship to said surface electronic circuit means, said magnetic susceptibility measuring circuit means operating to send data signals by current telemetry over said well-logging cable means to said surface electronic circuit means and including probe means for sensing magnetic susceptibility, said probe means including a heater means and a temperature transducer means for sensing the temperature of said probe means and providing an output signal which is a function of the magnitude of such sensed temperature, control means operative to receive said output signal from said temperature transducer means and for providing a control signal which varies linearly and is inversely proportional to said temperature transducer output signal, said control means including an operational amplifier having an inverting input, said temperature transducer means output signal being provided to the inverting input of said operational amplifier, a plurality of resistor means, and switch means for selectively connecting selected resistor means to said inverting input to set the temperature at which said probe means will be maintained, and power control means connected to receive said control signal and operative in response thereto to control the power to said heater means.

9. A magnetic susceptibility well-logging system comprising:
   surface electronic circuit means including a power supply;
   a well-logging cable means connected to said surface electronic circuit means and operative to conduct power from said power supply;
   a magnetic susceptibility measuring circuit means connected to said well-logging cable means in spaced relationship to said surface electronic circuit means, said magnetic susceptibility measuring circuit means operating to send data signals by current telemetry over said well-logging cable means and including probe means for sensing magnetic susceptibility;
   said probe means including a heater means and a first and second temperature transducer means for sensing the temperature of said probe means and providing output signals which are a function of the magnitude of the sensed temperature and control means operative to receive said output signal from said first temperature transducer means and for providing a control signal which varies linearly and is inversely proportional to said first temperature transducer output signal, and power control means to receive said control signal and operative in response thereto to control the power to said heater means; and
   conversion means in said susceptibility for measuring circuit connected to receive the output signal from said second temperature transducer means and for providing a voltage signal and voltage to current conversion means for receiving said voltage signal and providing a current signal on said well-logging cable means which is a function of said voltage signal.

10. The magnetic susceptibility well-logging system of claim 9 wherein said surface electronic circuit means includes current to voltage conversion means to receive the current signal on said well-logging cable means and provide a voltage signal which is a function thereof.

11. The magnetic susceptibility well-logging system of claim 10 wherein said data signals from said well-logging cable are transformer coupled to said surface electronic circuit means.

12. The magnetic susceptibility well-logging system of claim 9 wherein said probe means includes a solenoid sensing means having an elongated core, a solenoid coil wrapped on said elongated core, and mounting means to mount said heater means in concentric spaced relationship to said elongated core and solenoid coil, and a heat conducting medium filling the space between said heater means and said solenoid coil and elongated core, said temperature transducer means and second temperature transducer means being mounted upon said solenoid coil.

13. A magnetic susceptibility well-logging system having a single power supply thermoregulation system comprising surface electronic circuit means including a single power supply, a well-logging cable means connected to said surface electronic circuit means and operative to conduct power from said single power supply, and a magnetic susceptibility measuring circuit means connected to said well-logging cable means in spaced relationship to said surface electronic circuit means, said magnetic susceptibility measuring means including voltage regulator means connected to said well-logging cable means to receive power from said single power supply, said voltage regulator means operating to provide at least one regulated output voltage, a probe means for sensing magnetic susceptibility connected to receive regulated voltage from said voltage regulator means, said probe means including heater means powered from said voltage regulator means, temperature transducer means connected to receive regulated voltage from said voltage regulataor means and operative to sense the temperatare of said probe means and provide an output signal which is a function of the magnitude of said sensed temperature, control means connected to recieve regulated voltage from said voltage regulator means and the output signal from said temperature transducer means and operating to provide a control signal which varies linearly and is inversely proportional to said temperature transducer output signal, said control means including an operational amplifier having an inverting input, said temperature transducer output signal being provided to the inverting input of said operational amplifier, a plurality of resistor means, and switch means for selectively connecting selected resistor means to said inverting input to set the temperature at which said probe means will be maintained, and power control means connected to receive said control signal and operative in response thereto to control the power to said heater means.

14. The magnetic susceptibility well-logging system of claim 13, wherein said power control means includes a transistor connected in series with said heater means, said transistor including a base electrode connected to receive the control signal from said operational amplifier.

15. The magnetic susceptibility well-logging system of claim 13, wherein said measuring probe means includes a solenoid sensing means, said temperature transducer means being mounted on said solenoid sensing means, and mounting means to mount said heater means in spaced relationship to said solenoid sensing means.

16. The magnetic susceptibility well-logging system of claim 15, wherein said measuring probe means includes a casing enclosing said solenoid sensing means and said heater means, said casing being filled with a highly viscous, thermally stable silicone grease to thermally couple said heater means to said solenoid sensing means.

17. The magnetic susceptibility well-logging system of claim 13, wherein said magnetic susceptibility measuring circuit means includes second temperature transducer means for sensing the temperature of said probe means and providing an output signal which is a function of the magnitude of such sensed temperature, conversion means connected to receive said output signal from said second temperature transducer means and for providing a voltage signal which is a function of said output signal, and voltage to current conversion means for receiving said voltage signal and providing a current signal on said well-logging cable means which is a function of said voltage signal.

* * * * *